United States Patent
Park

(10) Patent No.: US 8,004,488 B2
(45) Date of Patent: Aug. 23, 2011

(54) LIGHT DEVICE INCLUDING A MULTI-SENSOR UNIT AND CONTROL METHOD THEREOF

(75) Inventor: Seong Soo Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 760 days.

(21) Appl. No.: 11/924,029

(22) Filed: Oct. 25, 2007

(65) Prior Publication Data

US 2008/0100563 A1    May 1, 2008

(30) Foreign Application Priority Data

Oct. 25, 2006  (KR) .................. 10-2006-0103971

(51) Int. Cl.
*G09G 3/36* (2006.01)

(52) U.S. Cl. ...................... 345/102; 345/207

(58) Field of Classification Search .......... 345/39, 345/84, 102, 207; 250/201.1
See application file for complete search history.

(56) References Cited

U.S. PATENT DOCUMENTS

| | | | | |
|---|---|---|---|---|
| 6,630,801 B2* | 10/2003 | Schuurmans | ............ | 315/307 |
| 6,753,661 B2* | 6/2004 | Muthu et al. | ............ | 315/307 |
| 7,319,298 B2* | 1/2008 | Jungwirth et al. | ............ | 315/307 |
| 7,468,721 B2* | 12/2008 | Nakano | ............ | 345/102 |
| 7,474,294 B2* | 1/2009 | Leo et al. | ............ | 345/102 |
| 7,538,755 B2* | 5/2009 | Jaffar et al. | ............ | 345/102 |
| 7,638,754 B2* | 12/2009 | Morimoto et al. | ............ | 250/226 |
| 2004/0119908 A1* | 6/2004 | Sakai | ............ | 349/65 |
| 2004/0233154 A1* | 11/2004 | Ono et al. | ............ | 345/102 |
| 2006/0118964 A1* | 6/2006 | Chang | ............ | 257/774 |
| 2007/0126656 A1* | 6/2007 | Huang et al. | ............ | 345/46 |
| 2007/0222741 A1* | 9/2007 | Itaya | ............ | 345/102 |

* cited by examiner

*Primary Examiner* — Chanh Nguyen
*Assistant Examiner* — Pegeman Karimi
(74) *Attorney, Agent, or Firm* — Saliwanchik, Lloyd & Eisenschenk

(57) ABSTRACT

Provided is a light device. The light device comprises a backlight unit, a multi-sensor unit, a backlight driving unit, and a backlight control unit. The backlight unit comprises light emitting diode devices to provide light. The multi-sensor unit is included in a light emission region of the backlight unit and senses a wavelength and/or intensity of light emitted from the light emitting diode devices and transmits sensed values as feedback. The backlight driving unit supplies driving power to the light emitting diode devices, and the backlight control unit receives the sensed values from the multi-sensor unit to control the light emitting diode devices through the backlight driving unit.

16 Claims, 3 Drawing Sheets

LIGHT DEVICE INCLUDING A MULTI-SENSOR UNIT AND CONTROL METHOD THEREOF

CROSS-REFERENCE TO RELATED APPLICATION

The present application claims the benefit under 35 U.S.C. §119 of Korean Patent Application No. 10-2006-0103971, filed Oct. 25, 2006, which is hereby incorporated by reference in its entirety.

BACKGROUND

A liquid crystal display (LCD) device is a light device that uses a backlight unit (BLU) as a light source because it cannot spontaneously emit light.

Examples of a BLU include Cold Cathode Fluorescent Lamps (CCFLs), External Electrode Fluorescent Lamps (EEFLs), and light emitting diodes (LEDs). These light sources are assembled to a chassis to illuminate light onto a light guide plate to provide light to an LCD device.

BRIEF SUMMARY

Embodiments of the present invention provide a light device having uniform brightness distribution and a control method thereof.

In one embodiment, a light device comprises: a backlight unit comprising light emitting diode (LED) devices; a multi-sensor unit included in a light emission region of the backlight unit capable of sensing a wavelength and/or intensity of light emitted from the light emitting diode devices and transmitting sensed values as feedback; a backlight driving unit for supplying driving power to the light emitting diode devices; and a backlight control unit for receiving the sensed values to control the light emitting diode devices.

In one embodiment, a method for controlling a light device includes: sensing a wavelength and/or intensity of light emitted from light emitting diode devices and transmitting sensed values as feedback using a multi-sensor unit provided in a light emission region of a backlight unit; controlling a duty ratio of the light emitting diode device using the sensed values; and driving the light emitting diode devices according to the duty ratio.

The details of one or more embodiments are set forth in the accompanying drawings and the description below. Other features will be apparent from the description and drawings, and from the claims.

DETAILED DESCRIPTION

A light device and a control method thereof will be described in detail according to embodiments of the present invention with reference to the accompanying drawings.

Figure 1:
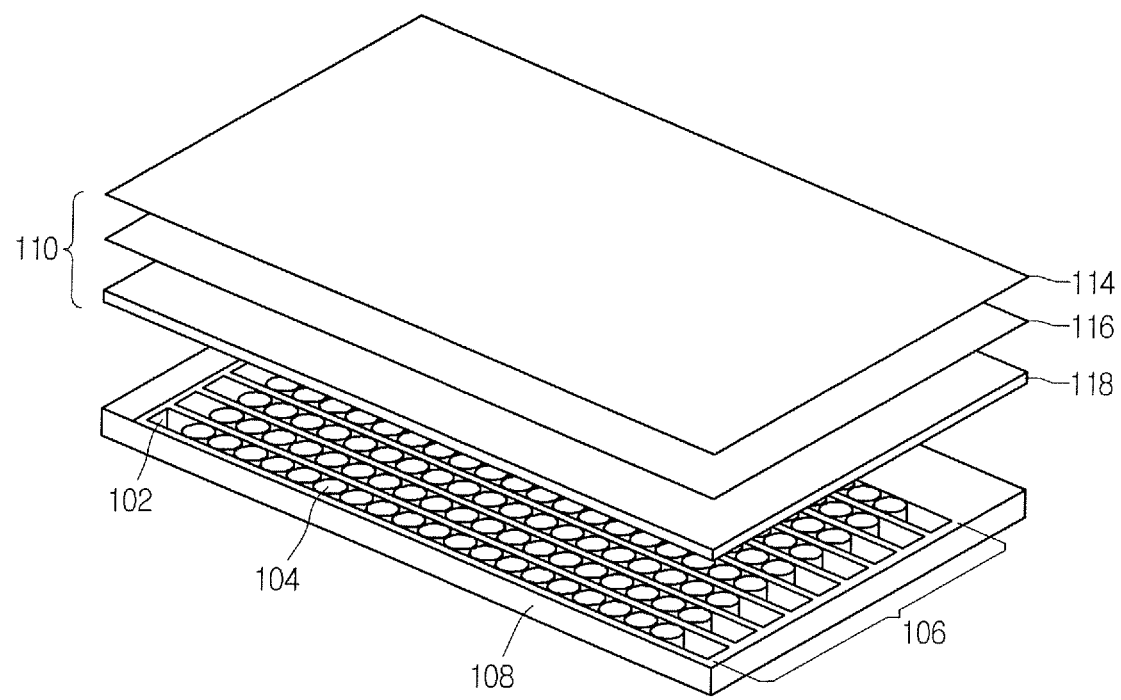
FIG. 1 is an exploded perspective view of a backlight unit.

FIG. 1 is an exploded perspective view of a backlight unit.

The backlight unit according to an embodiment of the present invention includes an optical sheet unit 110, an LED array 106 including a plurality of LED frames 102, and a backlight unit frame 108.

A plurality of LED devices 104 are mounted on the LED frame 102 to provide light, and the LED frames 102 are combined to form the LED array 106. The backlight unit frame 108 is an outer frame of the backlight unit.

The optical sheet unit 110 can include, for example, prism sheets 114 and 116, and a diffusion sheet 118. The diffusion sheet 118 functions to uniformly diffuse light emitted from the LED array 106 onto an entire surface, and the prism sheets 114 and 116 function to enhance light efficiency using refraction of light.

Figure 2:
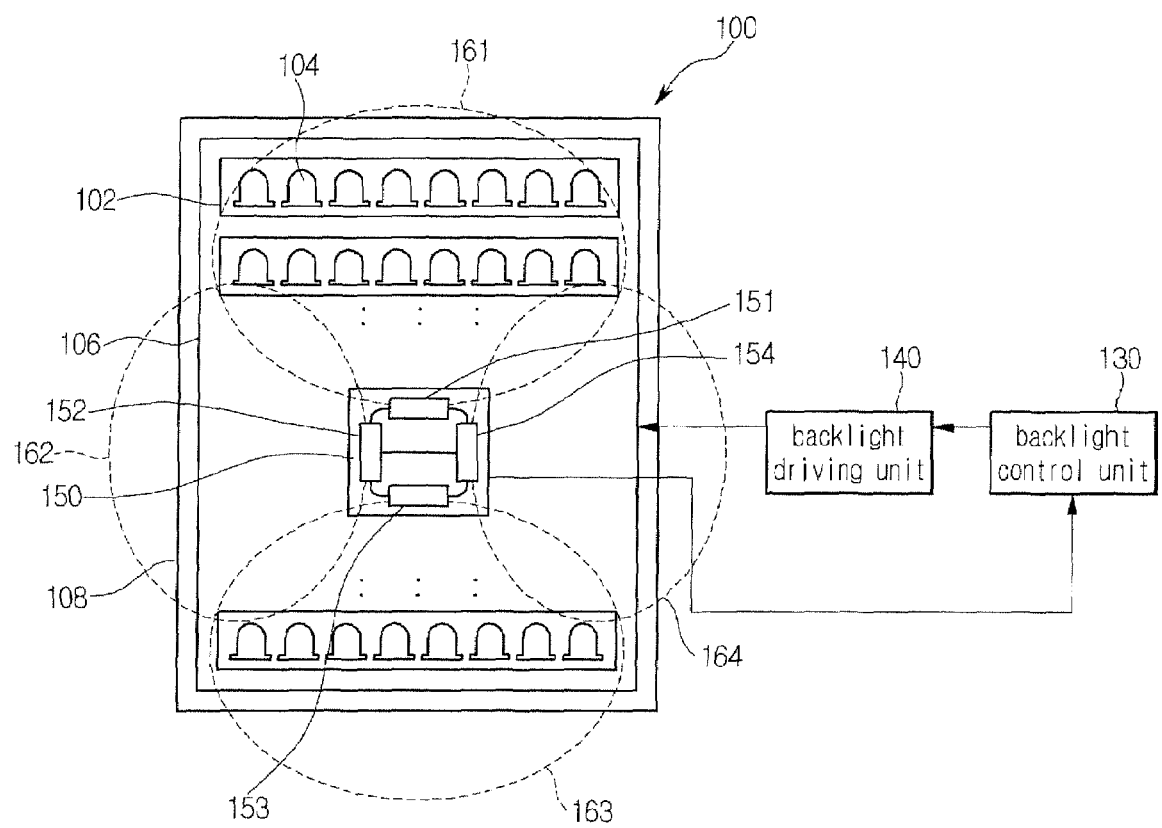
FIG. 2 is a view for explaining a light device and a control method thereof according to certain embodiments of the present invention.

FIG. 2 is a view for explaining a light device and a control method thereof according to certain embodiments of the present invention.

Referring to FIG. 2, a light device includes a BLU 100 having an LED array 106 including a plurality of LED frames 102, a backlight driving unit 140, and a backlight control unit 130.

The LED array 106 includes a plurality of LED frames 102 connected using a serial connection, a parallel connection, or a combination thereof. LED devices 104 in the LED frame 102 emit and provide light to a panel of a display device such as an LCD.

The backlight control unit 130 can apply a pulse width modulation (PWM) control method for controlling light intensity of the LED devices 104 in the LED frame 102 to control a backlight driving unit 140.

Meanwhile, for LED devices 104 having a semiconductor characteristic, an energy band gap, which determines the characteristic of spectrum (output wavelength), is dependent on heat emission and changes during operation.

That is, a change in the energy band gap generates a phase shift, and the energy band gap changes depending on a driving time and surrounding temperature. This characteristic of the LED is considered to be a limitation in application to a BLU of a light device such as an LCD device.

To address this problem, the light device according to certain embodiments of the present invention analyzes the wavelength and intensity of light output from the LED device 104 using a color sensor, and transmits the analysis result as feedback to the backlight control unit 130 to allow the backlight control unit 130 to control the LED device 104 using the results of the analysis.

In the light device according to embodiments, a multi-sensor unit 150 having a plurality of color sensors can be disposed at the central portion of the BLU 100. That is, in the light device, a multi-sensor unit 150 is disposed at a light emission region of the BLU 100. The multi-sensor unit 150 can be surrounded by the plurality of ED devices 104.

FIG. 2 exemplarily illustrates a multi-sensor unit 150 including a first color sensor 151, a second color sensor 152, a third color sensor 153, and a fourth color sensor 154.

The first color sensor 151, second color sensor 152, third color sensor 153, and fourth color sensor 154 each sense light output from the LED array 106 using a predetermined period (for example, 1 ms) and transmit the sensed values as feedback to the backlight control unit 130.

That is, according to an embodiment, the first color sensor 151, the second color sensor 152, the third color sensor 153, and the fourth color sensor 154 can measure a combination of three light wavelengths of red (R), green (G), and blue (B) output from the LED array 106 using a device such as a photodiode or a phototransistor, and then converts the measured value into an electrical signal. In other words, the first color sensor 151, second color sensor 152, third color sensor 153, and fourth color sensor 154 measure the wavelength and intensity of light output from the LED array 106, and transmit the measured wavelength and intensity as feedback to the backlight control unit 130.

The multi-sensor unit 150 can be installed at the central portion of the BLU 100, and the first color sensor 151, second color sensor 152, third color sensor 153, and fourth color sensor 154 included in the multi-sensor unit 150 can be disposed to face the four sides of a BLU frame 108, respectively. That is, the first color sensor 151, second color sensor 152, third color sensor 153, and fourth color sensor 154 can be disposed vertically and horizontally at right angles to each other (see FIG. 2).

The detecting ranges of the first color sensor 151, second color sensor 152, third color sensor 153, and fourth color sensor 154 are shown by dotted lines in FIG. 2.

The first color sensor 151, second color sensor 152, third color sensor 153, and fourth color sensor 154 can measure light output from various regions of the LED array 106 to transmit the measured values to the backlight control unit 130.

For example, in one embodiment, the first color sensor 151 senses light output from a first region 161, the second color sensor 152 senses light output from a second region 162, the third color sensor 153 senses light output from a third region 163, and the fourth color sensor 154 senses light output from a fourth region 164.

The first, second, third, and fourth color sensors 151, 152, 153, and 154 sense light output from the first, second, third, and fourth regions 161, 162, 163, and 164, respectively, thereby sensing light output from the entire region of the LED array 106.

Although four color sensors have been disposed on the multi-sensor unit described in the exemplary embodiment, various numbers (such as two, three, five, and six) of the color sensors can be used. Preferably, the numbers of color sensors are selected such that light output from the entire region of the LED array 106 can be sensed.

Also, in the light device according to embodiments of the present invention, the multi-sensor unit 150 is installed in the central portion of the LED array 106 such that the brightness of the central portion rather than the brightness of a peripheral portion can be more uniformly controlled.

The backlight driving unit 140 receives a control value from the backlight control unit 130 to perform driving current control of PWM having a turn on-turn off duty ratio for each LED device 104 inside the LED array 106.

Figure 3:
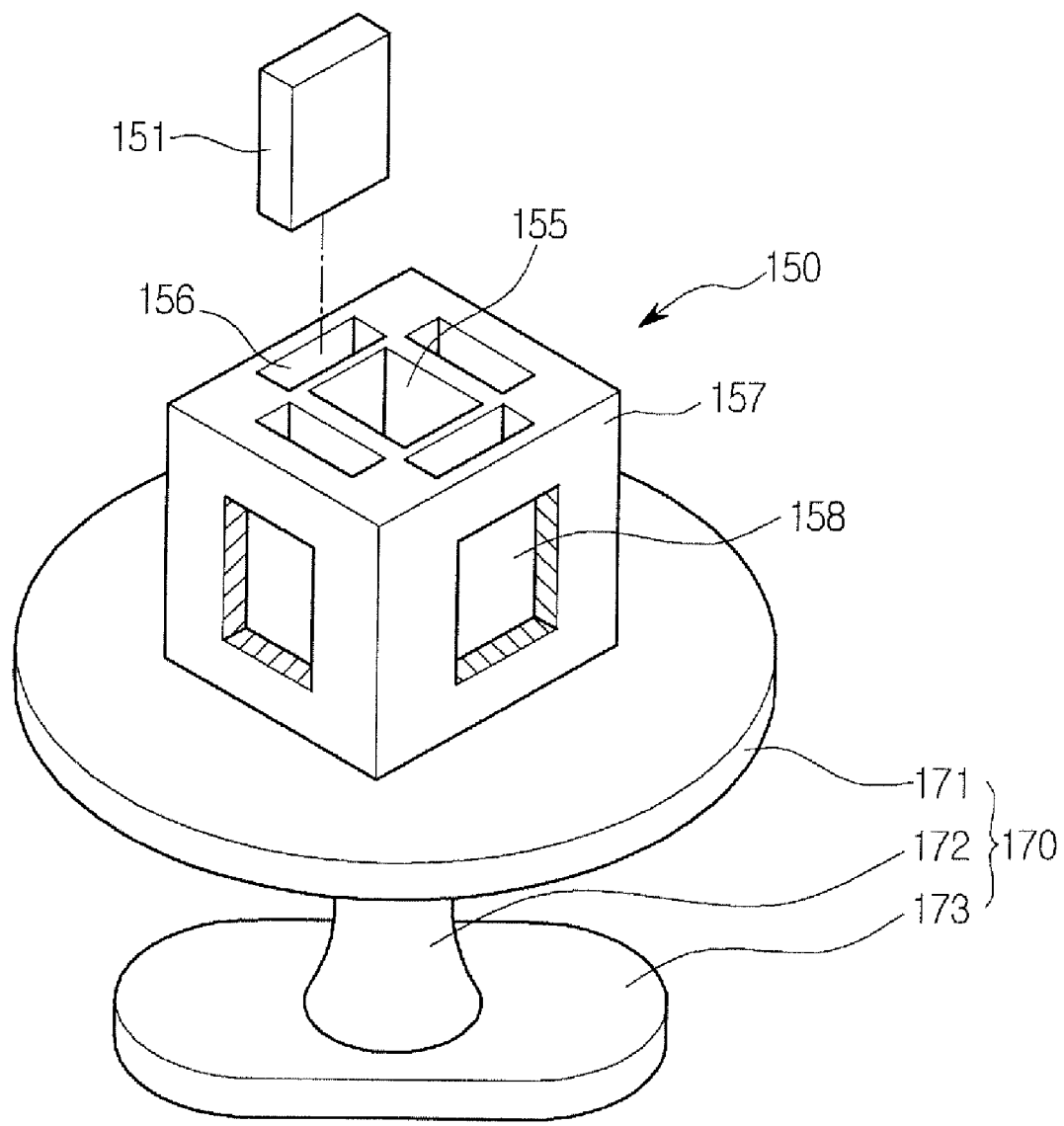
FIG. 3 is a view for explaining a multi-sensor unit of a light device according to certain embodiments of the present invention.

FIG. 3 is a view explaining a multi-sensor unit of a light device according to certain embodiments of the present invention.

According to an embodiment, the multi-sensor unit 150 can include a rectangular parallelepiped housing 157. The first color sensor 151, second color sensor 152, third color sensor 153, and fourth color sensor 154 can be disposed inside the housing 157.

A fixing pad 170 for fixing the housing 157 to the BLU 100 can be attached on the lower side of the housing 157.

The housing 157 can include four rectangular parallelepiped sensor insertion recesses 156 formed with an opening in the upper side of the housing 157 and corresponding to the four lateral sides of the housing 157. The first color sensor 151, second color sensor 152, third color sensor 153, and fourth color sensor 154 can be inserted into the sensor insertion recesses 156. In FIG. 3, only the first color sensor 151 is illustrated.

Sensor light reception holes 158 can be provided in the lateral sides of the housing 157 to allow the first, second, third, and fourth color sensors 151, 152, 153, and 154 inserted in the sensor insertion recesses 156 to sense light.

Since the first color sensor 151, second color sensor 152, third color sensor 153, and fourth color sensor 154 are disposed vertically along the lateral sides of the housing 157 at right angles from each other, and the sensor light reception holes 158 are formed to correspond to the first, second, third, and fourth color sensors 151, 152, 153, and 154, the sensors can sense light output from the entire region of the LED array 106.

Meanwhile, a through hole 155 can be provided in the upper central portion of the housing 157 and used as a space for wirings of the color sensors.

The housing 157 can be directly coupled to the BLU 100 and can be installed to the BLU 100 using the fixing pad 170.

In one embodiment, a fixing hole (not shown) can be formed in the BLU 100 so that the fixing pad 170 can be inserted and fixed in the fixing hole.

The fixing pad 170 can include a seat plate 171 on which the housing 157 is attached, a fixing plate 173 fixed in the fixing hole of the BLU 100, and a support 172 for connecting the seat plate 171 and the fixing plate 173.

Also, the fixing pad 170 can be formed of rubber to enhance elasticity and friction, thereby increasing coupling force with respect to the housing 157 and fixing force with respect to the BLU 100. It should be noted that the elements shown in the figures are not necessarily drawn to scale.

The light device according to embodiments of the present invention disposes a plurality of color sensors at a central portion of the BLU 100 to assist in making the brightness of light output from the BLU uniform.

Any reference in this specification to "a first embodiment," "a second embodiment," "an embodiment," "embodiments," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light device comprising:
    a backlight unit comprising light emitting diode devices;
    a multi-sensor unit provided in a light emission region of the backlight unit capable of sensing a wavelength and/or intensity of light emitted from the light emitting diode devices and transmitting sensed values as feedback;
    a backlight driving unit for supplying driving power to the light emitting diode devices; and a backlight control unit for receiving the sensed values from the multi-sensor unit to control the light emitting diode devices through the backlight driving unit, wherein the multi-sensor unit comprises:

a housing comprising a top surface, a bottom surface, and four lateral sides, and a plurality of color sensors, wherein a color sensor is installed inside each lateral side of the housing, wherein the housing further comprises sensor light reception holes formed in the four lateral sides of the housing to expose the plurality of color sensors.

2. The light device according to claim 1, wherein the multi-sensor unit is disposed at a central portion of the light emission region of the backlight unit.

3. The light device according to claim 1, wherein the plurality of color sensors comprise:

a first color sensor disposed facing a first side of the backlight unit, a second color sensor disposed facing a second side of the backlight unit, a third color sensor disposed facing a third side of the backlight unit, and a fourth color sensor disposed facing a fourth side of the backlight unit.

4. The light device according to claim 1, further comprising a fixing pad for fixing the housing to the backlight unit.

5. The light device according to claim 4, wherein the fixing pad comprises a seat plate on which the housing is attached, a fixing plate fixed onto the backlight unit, and a support connecting the seat plate with the fixing plate, and wherein the seat plate has an area greater than that of the support.

6. The light device according to claim 5, wherein the fixing pad is formed of rubber.

7. The light device according to claim 1, wherein the housing has a rectangular parallelepiped shape.

8. The light device according to claim 1, wherein the housing further comprises sensor insertion recesses having openings in an upper side of the housing, and wherein the plurality of color sensors is inserted and installed in the sensor insertion recesses.

9. The light device according to claim 1, wherein the plurality of color sensors comprise a first color sensor, a second color sensor, a third color sensor, and a fourth color sensor disposed inside the housing at right angles.

10. The light device according to claim 1, wherein the housing further comprises a through hole in an upper central portion of the housing for wirings of the color sensors.

11. A method for controlling a light device, the method comprising:

sensing a wavelength and/or intensity of light emitted from light emitting diode devices and transmitting sensed values as feedback using a multi-sensor unit provided in a light emission region of a backlight unit;

controlling a duty ratio of the light emitting diode devices using the sensed values transmitted as feedback; and driving the light emitting diode devices according to the duty ratio, wherein the multi-sensor unit comprises:

a housing comprising a top surface, a bottom surface, and four lateral sides, and a plurality of color sensors, wherein a color sensor is installed inside each lateral side of the housing, wherein the housing further comprises sensor light reception holes formed in the four lateral sides of the housing to expose the plurality of color sensors.

12. The method according to claim 11, wherein the multi-sensor unit is disposed at a central portion of the light emission region of the backlight unit.

13. The method according to claim 11, wherein the plurality of color sensors comprise:

a first color sensor disposed facing a first side of the backlight unit, a second color sensor disposed facing a second side of the backlight unit, a third color sensor disposed facing a third side of the backlight unit, and a fourth color sensor disposed facing a fourth side of the backlight unit.

14. The method according to claim 11, wherein the multi-sensor unit is fixed to the backlight unit with a fixing pad.

15. The method according to claim 11, wherein the housing further comprises sensor insertion recesses with openings in an upper side of the housing, and wherein the plurality of color sensors is inserted and installed in the sensor insertion recesses.

16. The method according to claim 11, wherein the plurality of color sensors comprise a first color sensor, a second color sensor, a third color sensor, and a fourth color sensor disposed inside the housing at right angles.

* * * * *